(12) United States Patent
Donald

(10) Patent No.: US 6,424,596 B1
(45) Date of Patent: Jul. 23, 2002

(54) METHOD AND APPARATUS FOR REDUCING NOISE FROM NEAR OCEAN SURFACE SOURCES

(75) Inventor: James B. Donald, Pawcatuck, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/968,398

(22) Filed: Oct. 1, 2001

(51) Int. Cl.$^7$ ................................................ G01S 3/86
(52) U.S. Cl. ...................... 367/135; 367/901; 367/124
(58) Field of Search .................. 367/118, 119, 367/124, 125, 131, 135, 901

(56) References Cited

U.S. PATENT DOCUMENTS

| | | | | |
|---|---|---|---|---|
| 5,216,640 A | * | 6/1993 | Donald et al. | 367/124 |
| 5,481,505 A | * | 1/1996 | Donald et al. | 367/130 |
| 5,886,951 A | * | 3/1999 | Wagstaff et al. | 367/135 |

* cited by examiner

*Primary Examiner*—Ian J. Lobo
(74) *Attorney, Agent, or Firm*—Michael J. McGowan; James M. Kasischke; Prithvi C. Lall

(57) ABSTRACT

The present invention is directed to a method and system for significantly reducing the acoustic noise from near-surface sources using an array processing technique that utilizes Multiple Signal Classification (MUSIC) beamforming and the Lloyd's Mirror interference pattern at very low frequencies. Noise from nearby near-surface sources, such as merchant ships, super tankers, fishing trawlers, seismic profiling platforms, or other sources near the ocean surface can significantly interfere with the detection and tracking of a quiet target-of-interest (TOI) located well below the ocean surface. The present invention reduces the noise of the near-surface sources without degrading the signal level and quality of the TOI. The present invention utilizes a unique application of the MUSIC beamforming process to separate the noise and signal subspace. Next, eigenvalue beamforming is used to reduce narrowband energy in selected frequency bins wherein the near-surface noise is radiating. Next, predetermined frequency and magnitude variance parameters are used to eliminate broadband noise emanating from the near-surface sources.

20 Claims, 3 Drawing Sheets

METHOD AND APPARATUS FOR REDUCING NOISE FROM NEAR OCEAN SURFACE SOURCES

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

Not applicable.

BACKGROUND OF THE INVENTION (1) Field of The Invention

The present invention generally relates to an apparatus and method for reducing the noise emanating from near-ocean surface sources without reducing the signal level of a target of interest.

(2) Description of the Prior Art

There have been several prior art methods developed to solve the sonar problem of reducing noise from a loud, near-surface noise source while maintaining the signal level of signals produced by the target of interest (TOI). As used herein, the phrases "near-surface noise source" or "near-surface source" refer to an object (e.g., ship) that is primarily located on or near the ocean surface. An intensive effort has been directed to the area of adaptive beamforming as evident by the development of the well known minimum variance distortion response (MVDR) algorithms. For ideal ocean conditions, when the spatial coherence of the acoustic field is known exactly, MVDR algorithms are optimum in minimizing the total noise field while maintaining the TOI's signal level constant. However, there is only a finite time to estimate the acoustic field spatial coherence. Furthermore, errors between the actual and estimated acoustic field spatial coherence degrade the performance of MVDR algorithms rapidly because MVDR algorithms are highly non-linear MVDR algorithms require the calculation of the inverse matrix for the acoustic field spatial coherence spectral matrix (CSM). Small errors in the estimate of CSM can propagate to very large errors in the estimate of the inverse matrix of CSM. The CSM is defined as the matrix of all cross product pairs of individual hydrophone time series Fast Fourier Transforms (FFTs). The CSM is described in detail in commonly owned U.S. Pat. No. 5,481,505. Therefore, MVDR algorithms are not robust in realistic open ocean environments, and are severely degraded when short averaging times must be used in tactical sonar systems.

A second class of prior art algorithms developed to address the aforementioned problem is referred to as the WHISPR family of processing algorithms. Although the number of different WHISPR related algorithms is relatively large, these algorithms rely on one physical principle: the acoustic time series of a near-surface noise source has a significantly greater time variance than the acoustic time series from a submerged target of interest due to the Lloyd's Mirror effect and several other causes. The Lloyd's Mirror effect is a highly variable interference pattern as a function of range between the source and receiver. The interference pattern is caused by the direct path and ocean surface-reflected paths between the source and receiver, and the fact that the amplitude of the fluctuations is significantly greater for near-surface sources than for deeper sources. In fact, a source that is more than two acoustic wavelengths in depth below the ocean's surface is said to be acoustically decoupled from the ocean's surface and is not subject to large acoustic time series variations in level due to Lloyd's Mirror interference. Other factors recognized by WHISPR algorithms are the relatively larger time fluctuations in energy received from near-surface sources. These fluctuations are caused by several factors, such as rapid change in propeller source depth as surface ships travel through ocean waves, or the cavitation of surface ships near the blades of their propellers due to high speeds and shallow depths.

Although WHISPR has shown some promise on selected acoustic data sets, it has never been developed into a real time system because it is not robust in real ocean environments. Specifically, time variability alone is not sufficiently robust to consistently reduce noise relative to the signal from the deeper TOI. Surface ships can produce a more stable signal if: (i) the ships are relatively large and have a deep draft, (ii) the ocean surface is rough, (iii) a bubble layer on the ocean surface scatters the reflected path from its spectral reflection, and (iv) the near-surface sound speed profile is significantly upward or downward refracting so that straight line propagation assumed by the Lloyd's Mirror effect is violated. There are other factors that contribute to a surface ship's ability to produce a relatively more stable signal. The aforementioned factors have prevented WHISPR from being developed into a robust, real time sonar algorithm, although it has been shown to perform well on carefully selected data sets that corresponded to conditions that were well suited for WHISPR.

Although there are other prior art noise reduction techniques, the MVDR and WHISPR algorithms have been the most commonly used.

What is needed is a new and improved noise reduction technique that addresses the inefficiencies of the aforementioned prior art noise reduction techniques.

SUMMARY OF THE INVENTION

The present invention is directed to, a method for significantly reducing the acoustic noise from near-surface sources using an array processing technique that utilizes Multiple Signal Classification (MUSIC) beamforming and the Lloyd's Mirror interference pattern at very low frequencies. Noise from nearby near-surface sources, such as merchant ships, super tankers, fishing trawlers, seismic profiling platforms, or other sources near the ocean surface can significantly interfere with the detection and tracking of a quiet target-of-interest (TOI) located well below the ocean surface. The present invention reduces the noise of the near-surface sources without degrading the signal level and quality of the TOI. The present invention utilizes a unique application of the MUSIC beamforming process to separate the noise and signal subspace. Next, eigenvalue beamforming is used to reduce narrowband energy in selected frequency bins wherein the near-surface noise is radiating. Next, predetermined frequency and magnitude variance parameters are used to eliminate broadband noise emanating from the near-surface sources.

BRIEF DESCRIPTION OF THE DRAWINGS

The figures are for illustration purposes only and are not drawn to scale. The invention itself, however, both as to organization and method of operation, may best be understood by reference to the detailed description which follows taken in conjunction with the accompanying drawings in which.

DESCRIPTION OF THE PREFERRED EMBODIMENT

In describing the preferred embodiments of the present invention, reference will be made herein to FIGS. 1, 2A and 2B of the drawings in which like numerals refer to like features of the invention.

Figure 1:
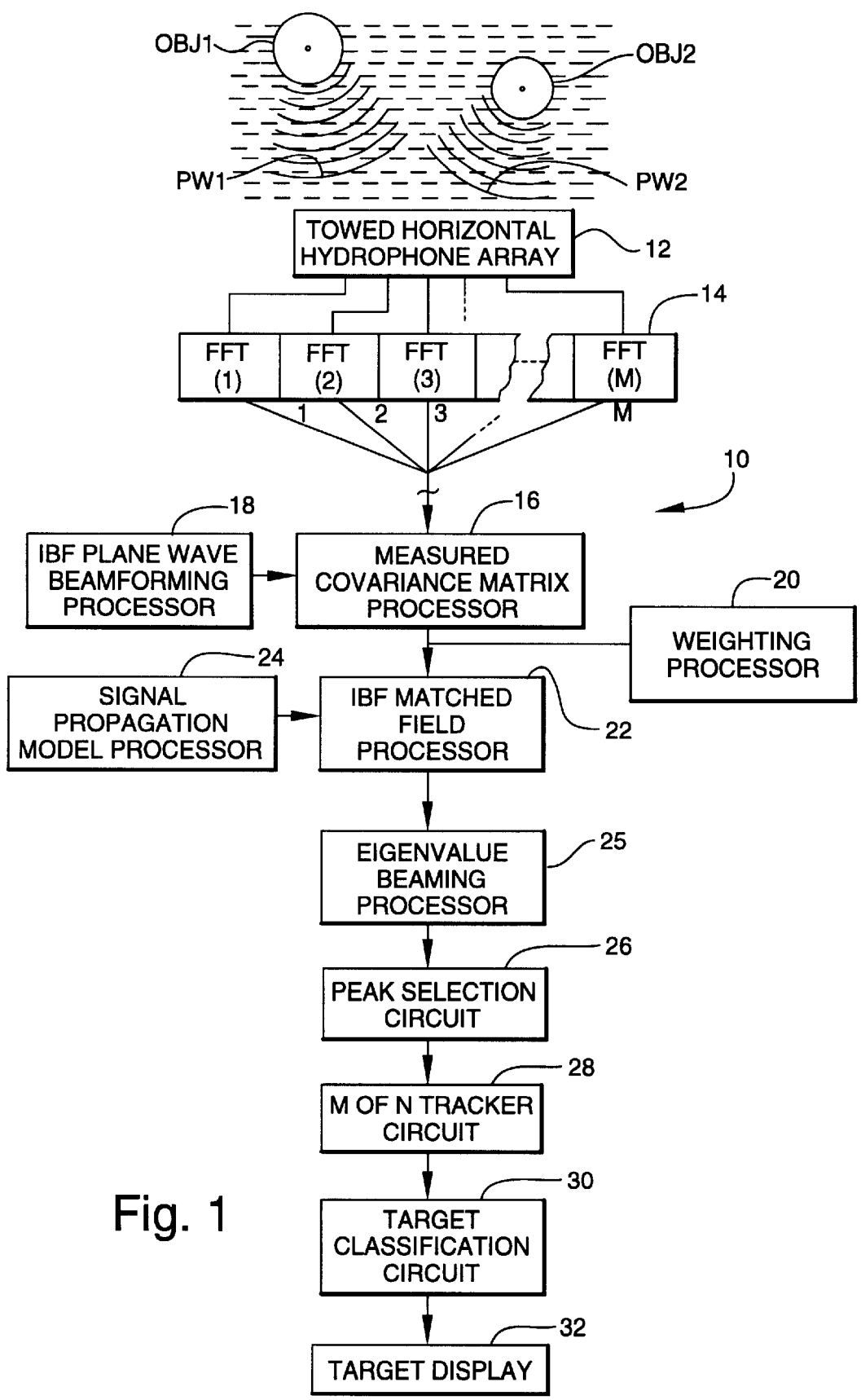
FIG. 1 is a block diagram of one embodiment of an apparatus for implementing the steps of the method of the present invention.

Referring to FIG. 1, there is shown system 10 of the present invention. System 10 includes a towed horizontal hydrophone array 12 that receives acoustic signals in the water for all potential sources including any underwater objects. OBJ1 and OBJ2 represent two objects that produce acoustic signals that radiate as multiple plane waves PW1 and PW 2 respectively. Object OBJ1 is a near-surface source of noise. Fast Fourier Transform (FFT) processors 14, shown as individual processors FFT(1) ... FFT(M), process signals from corresponding ones of M spaced hydrophones in the array 12. A conventional measured covariance matrix processor 16 receives the output signals from the FFT processors 14 and interacts with an inverse beamforming (IBF) plane wave beamforming processor 18 for producing an estimated bearing to a possible object. Such hardware is described in commonly owned U.S. Pat. No. 5,1481,505, the disclosure of which is incorporated herein by reference.

The remaining portions of system 10 utilize the estimated bearing signals from the IBF plane wave beamforming processor 18 and covariance matrix data supplied by the measured covariance matrix processor 16 to produce a beam value for each of a plurality of incremental ranges and depths along the estimated bearing. A weighting processor 20 provides appropriate weighting functions for the output of the measured covariance matrix processor 16.

IBF matched field processor 22 uses the output of the measured covariance matrix processor 16 in its original or weighted form and signals from a signal propagation model processor 24. Processor 24 models the signal propagation multi-path time arrival structure from each of a plurality of incremental locations located at incremental ranges and depths along the estimated bearing. The IBF matched field processor 22 then generates a correlation value for each such incremental location.

The data generated by IBF matched field processor 22 is entered into eigenvalue beaming processor 25. Processor 25 implements a particular algorithm, discussed in detail in the ensuing description to filter out the eigenvectors that are associated with the largest eigenvalues (i.e., the cause of interference). The actual number of eigenvectors filtered out or removed is assumed to be equal to the number of the nearby near-surface noise sources determined by the IBF plane wave beamforming processor 18. Processor 25 reduces the narrowband energy in selected frequency bins or broadband energy in several adjacent frequency bins where the near-ocean surface noise is radiating and outputs the filtered beam values. These filtered beam values are inputted into peak selection circuit 26.

Peak selection circuit 26 monitors each frequency bin or incremental location to determine if that cell contains a value that exceeds the values of the eight surrounding bins. The operation of this peak selection circuit 26, commonly called "Eight Nearest Neighbor Peak Picker", is known in the art and is described in U.S. Pat. No. 5,481,505.

An "M of N" tracker circuit 28 comprises a processor that utilizes the succession signals from the peak selection circuit 26 during each iteration to eliminate false targets. Specifically, M of N tracker circuit 28 acts as a filter that disregards transient occurrences of various maxima. Tracker circuit 28 employs various frequency characteristics of the potential objects, such as frequency characteristics that might exist during start-up of a torpedo. In this particular apparatus, tracker circuit 28 comprises a five-dimensional tracker that monitors correlation peak as a function of bearing, frequency, range, depth and time. Tracker circuit 28 includes data storage circuitry that allows storage of data defining various frequency characteristics of the potential objects.

System 10 further comprises target classification circuit 30 to classify a possible object as a target. Target display 32 provides the track of the bearing and range to and depth of each target over time.

Figure 2A:
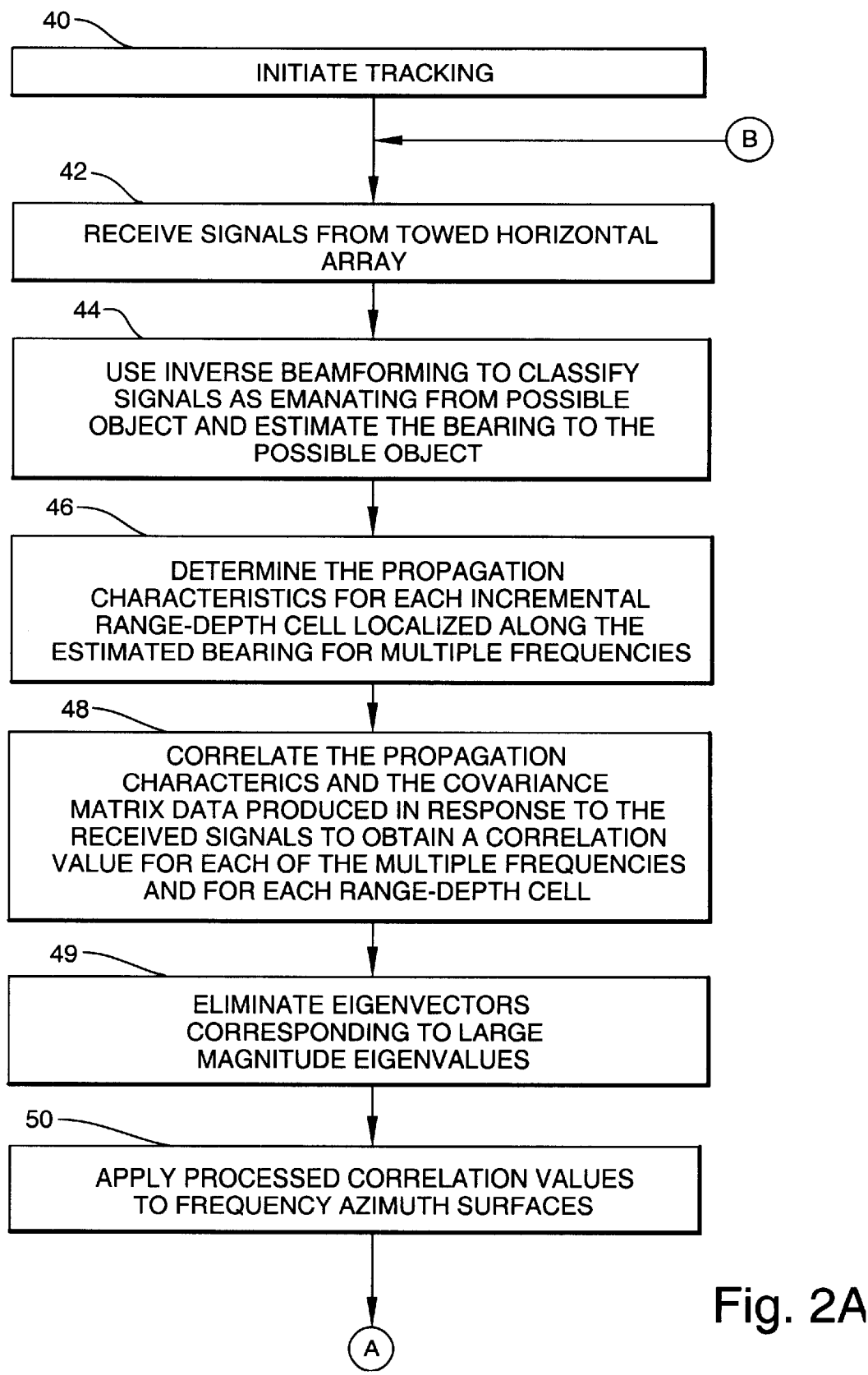
FIGS. 2A and 2B are flow charts illustrating the steps of the method of the present invention.
Figure 2B:
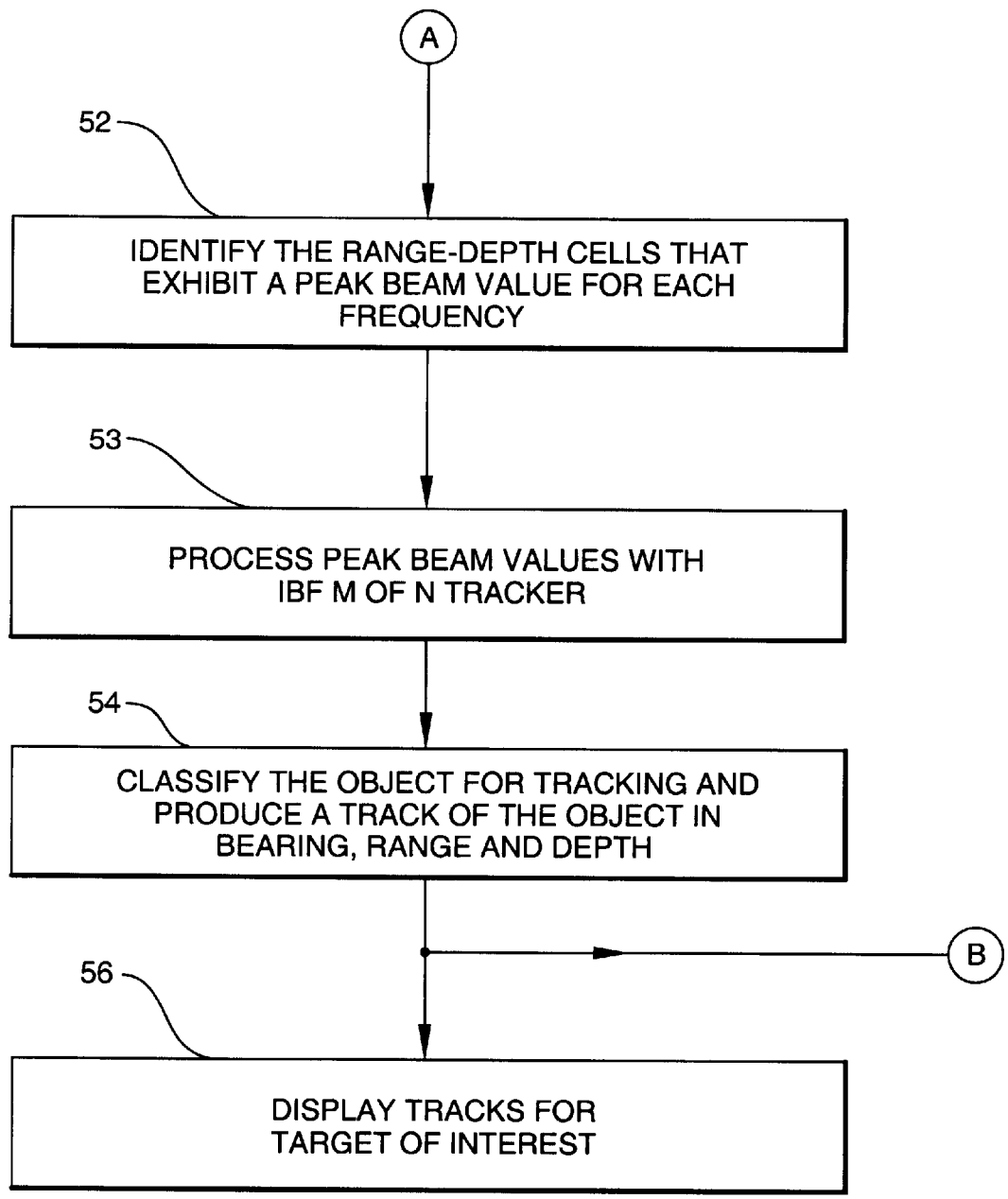

Referring to FIGS. 2A and 2B, there is shown a flow chart that illustrates the method of the present invention. Each step of the aforementioned procedure specifically refers to a portion or subsystem component of system 10 and provides a detailed explanation of how that particular component implements the particular method step in question.

In step 40, the first step of the method of the present invention, an operator initiates tracking of potential targets or objects. Next, in step 42, system 10 begins to process signals from towed horizontal array 12. FFT processors 14 process the signals received from array 12 and outputs the processed signals for input to covariance matrix processor 16.

Step 44 effects classification of signals as emanating from each possible object and estimates a bearing to each possible object. Step 44 is implemented by measured covariance matrix processor 16 which interacts with inverse beamforming processor 18 for producing an estimated bearing to a possible object. In this step, weighting processor 20 provides appropriate weighting functions for the output of the measured covariance matrix.

In Step 46, signal propagation module processor 24 determines the propagation time arrival structure for each of one or more paths between the array and each incremental range-depth cell localized along the estimated bearing or each bearing. These characteristics are also determined for a broad band of frequencies or for multiple narrowband frequencies, typically harmonics of a frequency that the possible object is known to generate.

Next, step 48 effects correlation of the propagation characteristics from the signal propagation model processor 24 and the covariance matrix data produced by covariance matrix processor 16 to obtain a correlation value for each of the multiple frequencies and for each range-depth cell or incremental location. Step 48 is implemented by IBF matched field processor 22. This produces a plurality of correlation peaks in several range-depth cells for each frequency bin, and the eigenvalues and eigenvectors are determined for each frequency where a significant correlation peak occurs from the object based upon the data in the covariance matrix. The eigenvalues and eigenvectors of the covariance matrix, $C_{ij}(f_k, t_m)$ are calculated for each increment of time $t_m$ and each frequency bin $f_k$ by the using standard matrix eigenvalue/eligenvector formula:

$$|C_{ij}(f_k, t_m) - \lambda I| = 0 \qquad (1)$$

wherein:

$C_{ij}(f_k, t_m)$ is the, complex valued covariance matrix for the $i^{th}$ times $j^{th}$ hydrophone pair at time $t_m$ in frequency bin $f_k$;

$\lambda$ is a set of nine scalar values satisfying Equation (2) called the "eigenvalues";

I is the unit identity matrix (all ones along the main diagonal and zeros elsewhere);

|| denotes a matrix; and

| is the determinant of the matrix $\|C_{ij}(t_m, f_k) - \lambda_m I\|$.

If there are M hydrophones in the array, the covariance matrix will be an M×M dimension matrix. If the covariance matrix is not singular (its determinant is not zero), there will be M distinct, real valued eigenvalues, $\lambda_m$, m=1, 2, 3, ... M, satisfying Equation (2) and these are ordered from high to low in accordance to magnitude. The eigenvectors, $\vec{e}_m$, corresponding to each eigenvalue, are then calculated by standard algorithms:

$$\|C_{ij}(t_m, f_k) - \lambda_m I\| \, \|\vec{e}_m\| = 0 \qquad (2)$$

and are normalized to unit magnitude $\|\vec{e}_m\| = 1$.

The eigenvectors are M×I dimensional matrices or vectors and form an orthonormal set defined by:

$$\|\vec{e}_m \cdot \vec{e}_m{}^H\| = \{1 \text{ if } m=m', 0 \text{ if } m \neq m' \qquad (3)$$

where "·" denotes the dot or scalar product.

In step 49, the eigenvectors that are associated with the eigenvalues having relatively large magnitudes are filtered out of the data produced by step 48. For real ocean environments, the signal and noise subspaces are neither orthogonal nor independent, and the distinction between the signal and noise subspaces is not quantitatively defined. These subspaces are defined quantitatively only when the signals are perfect plane waves and the noise is isotropic and spatially incoherent. In the real ocean environment, loud noise or strong interference sources correspond to the eigenvectors that have eigenvalues with the largest magnitudes.

The actual number of eigenvectors filtered out is assumed to be equal to the number of the nearby targets that fulfill particular interference criteria. IBF plane wave beamforming processor 18 determines the whether the plane wave data associated with each object meets the interference criteria. Thus, for example, if the plane wave data associated with five objects meets the interference criteria, then the eigenvectors associated with the eigenvalues having the five largest magnitudes are filtered out of each frequency bin of the data produced in step 48. The result of:step 49 is to reduce narrowband or broadband energy (i.e., magnitude) in selected frequency bins where the near-ocean surface noise is radiating, and output the filtered beam values.

Step 49 is implemented by processor 25. Specifically, processor 25 is implements a specific algorithm that utilizes a MUSIC technique and estimates the direction of arrival (DOA) of the acoustic signal signals and generates output beam values. Specifically, processor 25 is configured to implement an algorithm represented by equation (4):

$$B(\theta, f_K, t) = \sum_{m=1}^{M} \lambda_m \left[ sv(\vec{\theta}, f_k) \vec{e}_m(f_k, t_m) \vec{e}_m^H(f_k, t_m) sv(\vec{\theta}^H, f_k) \right] \qquad (4)$$

is wherein:

$B(\theta, f_k, t)$ is the beamformed output of IBF plane wave beamforming processor 18 at time $t_m$ for frequency bin $f_k$ for azimuth $\theta$;

$\overline{M=M}$ is the number of objects, or their eigenvectors, subtracted;

where $sv(\vec{\theta}, f_k)$ is the steering vector at azimuths in frequency bin $f_k$ and is a plane wave; and the vector notation "$\rightarrow$" is taken to be column matrices whose transpose complex conjugates (denoted by "H") are row matrices whose individual component's are complex conjugates.

Implementing equation (4) effects the generation of beam values for the eigenvectors associated with the remaining eigenvalues which were not removed or filtered out. After the processing function of processor 25 is complete, the beamforming portion of the method of the present invention is complete.

Next, in step 50, the beam values produced by step 49 are applied to a frequency azimuth surface for each increment of time $t_m$.

Next, in step 52, peak selection circuit 26 applies the eighth nearest neighbor peak picker (ENNPP) algorithm to each frequency azimuth surface in the same manner as described in U.S. Pat. No. 5,481,505. Thus, step 52 effects identification of the range-depth cells or incremental locations that exhibit a peak beam value for each frequency.

In step 53, the data signals outputted by peak selection circuit 26 are inputted into IBF M of N tracker circuit 28. Tracker circuit 28 determines the frequency and magnitude variance of all peaks in each ENNPP track that is to be displayed. In accordance with the present invention, the frequency and magnitude variance parameters of the IBF M of N tracker circuit 28 setting are reduced to new, predetermined frequency and magnitude variance parameters or criteria. Tracker circuit 28 selects ENNPP tracks for display that are within the new, predetermined frequency and magnitude variance parameters. The frequency variance parameter is defined by a particular bandwidth. The particular frequency and magnitude variance parameters that are selected depend upon the suspected type of noise source. Thus, a user of system 10 may vary the frequency and magnitude variance parameters until a desired result is achieved. Thus, noise and energy associated with frequencies outside of the particular bandwidth are filtered out by tracker circuit 28. As a result, the broadband noise associated with sources or objects near the ocean surface are eliminated. Thus, false targets or targets not of interest are eliminated from further analysis.

In step 54, the remaining ENNPP tracks are processed to in order to determine if any of the objects associated with these ENNPP tracks can be classified as a possible target of interest. This step is implemented by target classification circuit 30.

Step 56 effects display of the track, over time, of the (i) bearing, (ii) range to, and (iii) depth of each object classified as a target. This step is accomplished by target display 32. While the display step 56 shows the tracks for the track of interest, the method continues to collect and process data as evidenced by loop B.

Thus, the present invention significantly reduces the acoustic noises emanating from near-surface sources without degrading the level and quality of targets of interest. The method of the present invention does not utilize the non-linear operations that are utilized by the MVDR algorithms. Thus, the method of the present invention is very robust.

The principals, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention. Accordingly, the foregoing detailed description should be considered exemplary in nature and not limited to the scope and spirit of the invention as set forth in the attached claims.

What is claimed is:

1. A method of reducing noise emanating from near-ocean surface noise sources without degrading energy from a target of interest, comprising the steps of:
   receiving acoustic signals emanating from a plurality of objects including a target of interest and at least one near ocean-surface noise source;
   estimating bearings to the objects in response to the received acoustic signals;
   generating correlation values for the received acoustic signals from different incremental locations at incremental ranges and depths along the estimated bearings;
   identifying acoustic signals from the generated correlation values with a specific emanating object;
   evaluating the identified acoustic signals to determine if any of the generated correlation values correspond to a near-ocean surface noise source;
   eliminating the generated correlation values that correspond to near-ocean surface noise sources;
   analyzing the remaining generated correlation values to locate a peak beam value;
   selecting an individual incremental location corresponding to the located peak beam value;
   generating frequency and magnitude variance criteria;
   determining if the frequency and magnitude variance associated with the peak beam value that corresponds to the selected incremental location meets the frequency and magnitude variance criteria; and
   providing bearing, range and depth information pertaining to the selected incremental location if the frequency and magnitude variance associated with the peak beam value that corresponds to the selected incremental location meets the frequency and magnitude variance criteria.

2. The method according to claim 1 wherein the step of generating correlation values additionally includes generating correlation values along bearings offset from the estimated bearing.

3. The method according to claim 2 wherein the step of selecting an incremental location includes determining the peak beam value from all beam values from the estimated and offset bearings.

4. The method according to claim 3 wherein said step of generating correlation values is repeated at regular intervals whereby the bearing, depth, range and frequency information is provided as a function of time.

5. The method according to claim 4 further comprising the step of deploying an array of acoustic transducers before the step of receiving acoustic signals, the step of estimating bearings includes inverse beamforming processing the acoustic signal from each acoustic transducer in the array.

6. The method according to claimis wherein said inverse beamforming processing uses different frequencies and multi-path analysis.

7. The method according to claim 6 wherein said step of generating correlation values from an incremental location includes obtaining a correlation value for each frequency and for each incremental location.

8. The method according to claim 7 wherein:
   said step of estimating bearings includes generating a propagation time arrival structure for each estimated bearing between one object and each acoustic transducer; and
   said step of generating correlation values including:
   generating a measured covariance matrix based upon the acoustic signals from the array; and
   correlating the results of the propagation time arrival structure and the measured covariance matrix.

9. The method according to claim 7 wherein the step of selecting an individual incremental location includes the step of determining peak values based upon an inverse beamformer eight nearest neighbor peak picker analysis.

10. The method as recited in claim 9 further comprising the step of providing a multi-dimension M of N tracker configured to provide determined peak values versus bearing, frequency, range, depth and time, and wherein the step of selecting an individual incremental location additionally includes the step of analyzing the succession of peak values in an M of N tracker.

11. The method according to claim 10 further comprising the steps of:
   generating frequency and magnitude criteria; and
   configuring the M of N tracker so as to eliminate the peak values that correspond to frequency and magnitude variance parameters that do not meet the frequency and magnitude variance criteria.

12. The method according to claim 1 wherein:
   each said generated correlation value is generated for each of a plurality of frequency bands over time;
   said step of providing bearing, range and depth information additionally comprises providing frequency information of the received acoustic signals; and
   said method additionally comprising the step of analyzing the provided frequency information for evaluating the identified acoustic signals.

13. The method according to claim 1 wherein:
   said generating correlation values step comprises: generating a measured covariance matrix from the acoustic signals having covariance matrix data;
   generating eigenvalues and corresponding eigenvectors based upon the covariance matrix data;
   said step of evaluating identified acoustic signals comprising:
   generating a predetermined eigenvalue magnitude criteria;
   comparing the eigenvalues to the eigenvalue magnitude criteria; and
   said step of eliminating the generated correlation values comprising eliminating eigenvectors that correspond to the eigenvalues that do not meet the eigenvalue magnitude criteria.

14. A system reducing noise emanating from near-ocean surface noise sources without degrading energy from a target of interest, comprising:
   a receiver having a towed horizontal array of transducers for receiving acoustic signals emanating from a plurality of objects including a target of interest and at least one near ocean-surface noise source;

means for estimating bearings to the objects in response to the received acoustic signals, said means for estimating bearings including an inverse beamforming processor for processing the received acoustic signals;

means for generating correlation values for the received acoustic signals from different incremental locations at incremental ranges and depths along the estimated bearings;

means for identifying acoustic signals from the generated correlation values with a specific emanating object;

means for evaluating the identified acoustic signals to determine if any of the generated correlation values correspond to a near-ocean surface noise source;

means for eliminating the generated correlation values that correspond to near-ocean surface noise sources;

means for analyzing the remaining generated correlation values to locate a peak beam value;

means for selecting an individual incremental location corresponding to the located peak beam value;

means for generating frequency and magnitude variance criteria;

means for determining if the frequency and magnitude variance associated with the peak beam value that corresponds to the selected incremental location meets the frequency and magnitude variance criteria; and means for providing bearing, range and depth information pertaining to the selected incremental location if the frequency and magnitude variance associated with the peak beam value that corresponds to the selected incremental location meets the frequency and magnitude variance criteria.

15. The system according to claim 14 wherein said correlation value generating means comprises a processor for generating correlation values along bearings offset from the estimated bearing.

16. The system according to claim 15 further including means for obtaining a correlation value for each frequency and for each incremental location.

17. The system according to claim 16 wherein:

said bearing estimating means includes means for generating a propagation time arrival structure for each estimated bearing between one object and each acoustic transducer; and said correlation value generating means further includes:

means for generating a measured covariance matrix based upon the acoustic signals from the array; and means for correlating the results of the propagation time arrival structure and the measured covariance matrix.

18. The system according to claim 17 wherein the selecting means includes an eight nearest neighbor peak picker for determining peak values.

19. The system according to claim 18 further comprising a multi-dimension M of N tracker configured to provide determined peak values versus bearing, frequency, range, depth and time.

20. The method according to claim 19 further comprising:

means for generating frequency and magnitude criteria; and means for configuring the M of N tracker so as to eliminate the peak values that correspond to frequency and magnitude variance parameters that do not meet the frequency and magnitude variance criteria.

* * * * *